US010811898B2

(12) United States Patent
Toyoda

(10) Patent No.: US 10,811,898 B2
(45) Date of Patent: Oct. 20, 2020

(54) UNINTERRUPTIBLE POWER SUPPLY DEVICE

(71) Applicant: TOSHIBA MITSUBISHI-ELECTRIC INDUSTRIAL SYSTEMS CORPORATION, Chuo-ku (JP)

(72) Inventor: Masaru Toyoda, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 65 days.

(21) Appl. No.: 16/093,023

(22) PCT Filed: Apr. 14, 2016

(86) PCT No.: PCT/JP2016/061968
§ 371 (c)(1),
(2) Date: Oct. 11, 2018

(87) PCT Pub. No.: WO2017/179162
PCT Pub. Date: Oct. 19, 2017

(65) Prior Publication Data
US 2019/0181677 A1 Jun. 13, 2019

(51) Int. Cl.
*H02J 7/34* (2006.01)
*H02J 9/06* (2006.01)
(Continued)

(52) U.S. Cl.
CPC .............. *H02J 7/345* (2013.01); *H02J 7/02* (2013.01); *H02J 7/34* (2013.01); *H02J 9/06* (2013.01);
(Continued)

(58) Field of Classification Search
CPC ...... H02J 9/062; H02J 7/00; H02J 9/06; H02J 7/34; H02J 7/007; H02J 7/345;
(Continued)

(56) References Cited

U.S. PATENT DOCUMENTS 8,629,637 B2 * 1/2014 Blasko .................... B66B 1/302
                                                          318/376
9,118,270 B2 * 8/2015 Niwa ......................... H02P 3/12
(Continued)

FOREIGN PATENT DOCUMENTS

JP          5-64378 A      3/1993
JP         11-299275 A    10/1999
(Continued)

OTHER PUBLICATIONS

International Search Report dated May 17, 2016 in PCT/JP2016/061968 filed Apr. 14, 2016.
(Continued)

*Primary Examiner* — Nha T Nguyen
(74) *Attorney, Agent, or Firm* — Oblon, McClelland, Maier & Neustadt, L.L.P.

(57) ABSTRACT

An uninterruptible power supply device includes: an inverter configured to convert AC power from an AC power supply into DC power and output the DC power to a DC bus; a converter configured to convert the DC power received from the DC bus into AC power and supply the AC power to a load; a bidirectional chopper configured to transmit and receive DC power between the DC bus and a storage battery; a bidirectional chopper configured to transmit and receive DC power between the DC bus and a lithium ion battery; a controller configured to cause the storage battery to be charged during normal operation, and to be discharged during power failure; and a controller configured to cause the lithium ion battery to be charged when the load is performing a regenerative operation, and to be discharged when the load is performing a power running operation.

11 Claims, 6 Drawing Sheets

(51) Int. Cl.
*H02J 7/02* (2016.01)
*H02M 3/335* (2006.01)
*H02M 7/48* (2007.01)

(52) U.S. Cl.
CPC ......... *H02J 9/062* (2013.01); *H02M 3/33584* (2013.01); *H02M 7/48* (2013.01)

(58) Field of Classification Search
CPC .... H02J 9/061; H02J 2207/20; H02J 2310/48; H02J 3/1807; H02J 3/38; H02J 3/381; H02J 3/383; H02J 3/386; H02J 3/46; H02J 4/00; H02J 7/0013; H02J 7/0029; H02J 7/00306; H02J 7/0068; H02J 7/022; H02J 7/085; H02J 7/14; H02J 9/005; H02J 7/02; H02M 5/4585; H02M 3/33584; H02M 5/458; H02M 7/003; H02M 1/36; H02M 2001/0022; H02M 3/158; H02M 3/44; H02M 7/44; H02M 7/4807; H02M 7/487; H02M 7/537; H02M 7/53875; H02M 7/48; H02P 27/06; H02P 29/032; H02P 3/18
See application file for complete search history.

(56) References Cited

U.S. PATENT DOCUMENTS

| | | | | |
|---|---|---|---|---|
| 9,534,823 B2* | 1/2017 | Park | ............... | F24F 11/30 |
| 2001/0017237 A1* | 8/2001 | Tominaga | ............... | B66B 1/30 |
| | | | | 187/290 |
| 2001/0017239 A1* | 8/2001 | Tajima | ............... | B66B 1/30 |
| | | | | 187/290 |
| 2001/0017242 A1* | 8/2001 | Tajima | ............... | B66B 1/30 |
| | | | | 187/296 |
| 2006/0164044 A1* | 7/2006 | Keat | ............... | H02M 3/33515 |
| | | | | 320/166 |
| 2009/0014252 A1 | 1/2009 | Vedula et al. | | |
| 2009/0230903 A1* | 9/2009 | Yamamoto | ............... | H02M 7/53875 |
| | | | | 318/400.3 |
| 2010/0133910 A1* | 6/2010 | Lai | ............... | H02J 9/062 |
| | | | | 307/66 |
| 2011/0025236 A1* | 2/2011 | Takizawa | ............... | H02M 1/32 |
| | | | | 318/139 |
| 2011/0147130 A1* | 6/2011 | Oggianu | ............... | B66B 1/302 |
| | | | | 187/290 |
| 2011/0170322 A1* | 7/2011 | Sato | ............... | H02J 9/062 |
| | | | | 363/40 |
| 2011/0175452 A1* | 7/2011 | Hoshino | ............... | H02J 7/34 |
| | | | | 307/66 |
| 2011/0226559 A1* | 9/2011 | Chen | ............... | G01R 35/005 |
| | | | | 187/290 |
| 2012/0200171 A1* | 8/2012 | Sato | ............... | H02J 9/062 |
| | | | | 307/113 |
| 2013/0082628 A1* | 4/2013 | Takegami | ............... | H02P 27/06 |
| | | | | 318/139 |
| 2014/0021888 A1* | 1/2014 | Niwa | ............... | H02P 27/00 |
| | | | | 318/139 |
| 2016/0016483 A1* | 1/2016 | Yasunori | ............... | B60L 50/40 |
| | | | | 320/162 |
| 2016/0056667 A1* | 2/2016 | Konishi | ............... | H02J 9/062 |
| | | | | 307/66 |
| 2016/0096437 A1* | 4/2016 | Tripathi | ............... | H02J 3/381 |
| | | | | 307/31 |
| 2016/0156201 A1* | 6/2016 | Park | ............... | H01M 10/425 |
| | | | | 320/134 |
| 2017/0149273 A1* | 5/2017 | Lee | ............... | H05B 45/37 |
| 2017/0149369 A1* | 5/2017 | Watabu | ............... | H02P 27/06 |
| 2017/0179759 A1* | 6/2017 | Johansen | ............... | H02J 7/007 |
| 2017/0256957 A1* | 9/2017 | Buiel | ............... | H02M 7/04 |
| 2017/0310152 A1* | 10/2017 | Toyoda | ............... | H02J 9/06 |
| 2018/0262045 A1* | 9/2018 | Ohnishi | ............... | H02M 5/4585 |
| 2018/0316216 A1* | 11/2018 | Masunaga | ............... | H02J 9/062 |
| 2019/0089181 A1* | 3/2019 | Toyoda | ............... | H02J 7/022 |

FOREIGN PATENT DOCUMENTS

| | | | |
|---|---|---|---|
| JP | 2009-143711 A | | 7/2009 |
| JP | 2009143711 | * | 7/2009 |
| JP | 2012-75274 A | | 4/2012 |
| JP | 2013-150369 A | | 8/2013 |
| JP | 2014-117041 A | | 6/2014 |

OTHER PUBLICATIONS

The partial Supplementary European Search Report dated Aug. 9, 2019 in European Patent Application 16898622.2, 15 pages.
Extended European Search Report dated Nov. 15, 2019, in Patent Application No. 16898622.2, 14 pages.
Japanese Office Action dated Nov. 26, 2019, in Patent Application No. 2018-511828, 21 pages (with English translation).
Korean Office Action dated Feb. 26, 2020 in Korean Patent Application No. 10-2018-7031684 (with English translation), 14 pages.
Office Action dated Jun. 29, 2020 in India Patent Application No. 201817041446, 6 pgs.

* cited by examiner

UNINTERRUPTIBLE POWER SUPPLY DEVICE

TECHNICAL FIELD

The present invention relates to an uninterruptible power supply device, and in particular to an uninterruptible power supply device including a converter configured to convert AC power into DC power and an inverter configured to convert the DC power into AC power.

BACKGROUND ART

Japanese Patent Laying-Open No. 2013-150369 (PTD 1) discloses a power conversion system including a converter connected between an alternating current (AC) power supply and a direct current (DC) bus, a first DC/DC converter connected between a DC power generator and the DC bus, a second DC/DC converter connected between a power storage device and the DC bus, and an inverter connected between the DC bus and a load.

CITATION LIST

Patent Document

PTD 1: Japanese Patent Laying-Open No. 2013-150369

SUMMARY OF INVENTION

Technical Problem

In PTD 1, if regenerative power is generated by the load when the power storage device is fully charged, the regenerative power is returned to the AC power supply via the inverter, the DC bus, and the converter, to suppress an increase in a voltage of the DC bus. However, in a case where the AC power supply is a private power generator, it is not possible to return the regenerative power generated by the load to the AC power supply (that is, the private power generator), causing an increase in the voltage of the DC bus.

Therefore, a main object of the present invention is to provide an uninterruptible power supply device capable of suppressing an increase in a voltage of a DC bus without returning regenerative power generated by a load to an AC power supply.

Solution to Problem

An uninterruptible power supply device in accordance with the present invention includes: a converter configured to convert AC power from an AC power supply into DC power and output the DC power to a DC bus; an inverter configured to convert the DC power received from the DC bus into AC power and supply the AC power to a load; a first bidirectional chopper configured to transmit and receive DC power between the DC bus and a first power storage device; a second bidirectional chopper configured to transmit and receive DC power between the DC bus and a second power storage device; a first controller configured to control the first bidirectional chopper such that a current flows from the DC bus to the first power storage device when the AC power is supplied normally from the AC power supply, and control the first bidirectional chopper such that a current flows from the first power storage device to the DC bus when the AC power is not supplied normally from the AC power supply; and a second controller configured to perform a first mode.

In the first mode, the second controller is configured to control the second bidirectional chopper such that a current flows from the DC bus to the second power storage device when the load is performing a regenerative operation, and control the second bidirectional chopper such that a current flows from the second power storage device to the DC bus when the load is performing a power running operation.

Another uninterruptible power supply device in accordance with the present invention includes: a first terminal connected to a first load; a second terminal connected to a second load for consuming regenerative power generated by the first load; a converter configured to convert AC power from an AC power supply into DC power and output the DC power to a DC bus; an inverter configured to convert the DC power received from the DC bus into AC power and output the AC power to the first terminal; a bidirectional chopper configured to transmit and receive the DC power between the DC bus and a power storage device; a first controller configured to control the bidirectional chopper such that a current flows from the DC bus to the power storage device when the AC power is supplied normally from the AC power supply, and control the bidirectional chopper such that a current flows from the power storage device to the DC bus when the AC power is not supplied normally from the AC power supply; a first switch connected between the first and second terminals; and a second controller configured to perform a first mode. In the first mode, the second controller is configured to turn on the first switch when the first load is performing a regenerative operation, and turn off the first switch when the first load is performing a power running operation.

Advantageous Effects of Invention

In the uninterruptible power supply device in accordance with the present invention, the second bidirectional chopper configured to transmit and receive the DC power between the DC bus and the second power storage device is provided, the second power storage device is charged when the load is performing the regenerative operation, and the second power storage device is discharged when the load is performing the power running operation. Therefore, an increase in voltage of the DC bus can be suppressed without returning regenerative power generated by the first load to the AC power supply.

In the other uninterruptible power supply device in accordance with the present invention, the first switch is connected between the first terminal to which the first load is connected and the second terminal to which the second load for consuming the regenerative power generated by the first load is connected, the first switch is turned on when the first load is performing the regenerative operation, and the first switch is turned off when the first load is performing the power running operation. Therefore, an increase in voltage of the DC bus can be suppressed without returning the regenerative power generated by the load to the AC power supply.

DESCRIPTION OF EMBODIMENTS

First Embodiment

Figure 1:
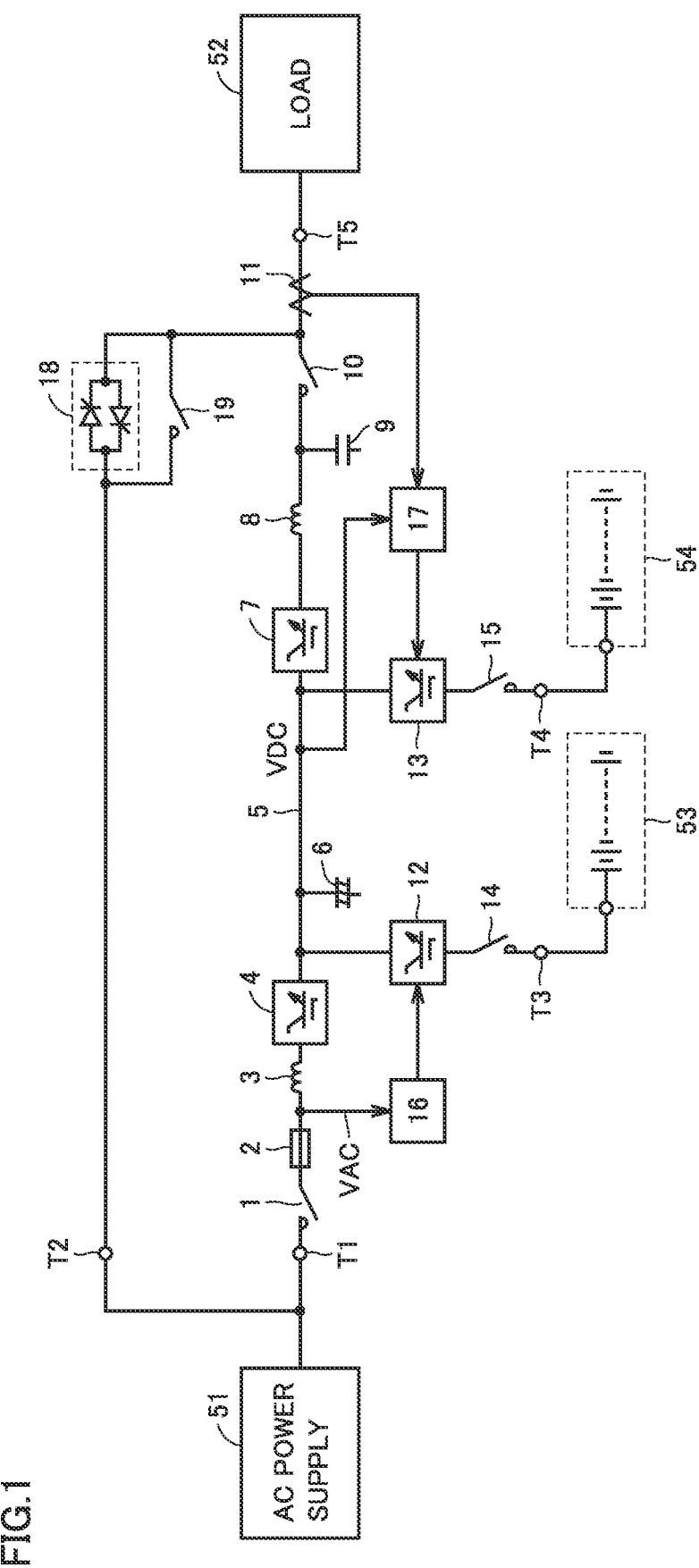
FIG. 1 is a circuit block diagram showing a configuration of an uninterruptible power supply device in accordance with a first embodiment of the present invention.

FIG. 1 is a circuit block diagram showing a configuration of an uninterruptible power supply device in accordance with a first embodiment of the present invention. The uninterruptible power supply device is configured to once convert three-phase AC power supplied from an AC power supply 51 into DC power, reconvert the DC power into three-phase AC power, and supply the three-phase AC power to a load 52. FIG. 1 shows a circuit for only one phase for simplification of the drawings and description.

The uninterruptible power supply device includes an input terminal T1, a bypass terminal T2, DC terminals T3 and T4, and an output terminal T5. Input terminal T1 is connected to AC power supply 51. AC power supply 51 may be a commercial AC power supply or a private power generator. AC power supply 51 supplies AC power having a commercial frequency, for example, to the uninterruptible power supply device.

Bypass terminal T2 is connected to a bypass AC power supply. The bypass AC power supply may be a commercial AC power supply or a private power generator. FIG. 1 shows a case where bypass terminal T2 is connected to AC power supply 51 together with input terminal T1.

DC terminal T3 is connected to a storage battery 53. Storage battery 53 is charged when the AC power from AC power supply 51 is supplied normally, and is discharged when the AC power from AC power supply 51 is not supplied normally (for example, during power failure). DC terminal T4 is connected to a lithium ion battery 54. Lithium ion battery 54 is charged when load 52 is performing a regenerative operation, and is discharged when load 52 is performing a power running operation.

Storage battery 53 has an advantage that it is inexpensive, but has a disadvantage that it is more degraded due to charge and discharge and cannot be charged and discharged many times. In contrast, lithium ion battery 54 has a disadvantage that it is expensive, but has an advantage that it is less degraded due to charge and discharge and can be charged and discharged many times. Accordingly, since power failure does not occur often but a large amount of power is required in case of power failure, storage battery 53 is used as a battery for storing DC power used during power failure. Lithium ion battery 54 is used as a battery charged and discharged whenever the regenerative operation and the power running operation of load 52 are switched.

Output terminal T5 is connected to load 52. Load 52 is a motor, for example, and is driven by the AC power supplied from the uninterruptible power supply device. In the first embodiment, it is assumed that the case where load 52 is performing the power running operation and the case where load 52 is performing the regenerative operation are alternately repeated.

The uninterruptible power supply device includes switches 1, 10, 14, 15, and 19, a fuse 2, reactors 3 and 8, a converter 4, a DC bus 5, capacitors 6 and 9, an inverter 7, a current detector 11, bidirectional choppers 12 and 13, controllers 16 and 17, and a semiconductor switch 18.

Switch 1, fuse 2, and reactor 3 are connected in series between input terminal T1 and an input terminal of converter 4. Switch 1 is turned on when the uninterruptible power supply device is used, and is turned off during maintenance of the uninterruptible power supply device, for example. Fuse 2 is blown when overcurrent flows to protect the uninterruptible power supply device. Reactor 3 enables the passage of an AC current from AC power supply 51 to converter 4, and disables the passage of a signal having a switching frequency generated by converter 4.

Converter 4 receives the AC power supplied from AC power supply 51 via switch 1, fuse 2, and reactor 3. When the AC power from AC power supply 51 is supplied normally, converter 4 converts the AC power from AC power supply 51 into DC power, and outputs the DC power to DC bus 5. Even when a DC voltage VDC of DC bus 5 becomes higher than a rated voltage VR due to regenerative power generated by load 52, converter 4 does not return the regenerative power to the AC power supply 51 side. When the AC power from AC power supply 51 is not supplied normally (that is, during power failure), operation of converter 4 is stopped.

DC bus 5 is connected between an output terminal of converter 4 and an input terminal of inverter 7 to transmit the DC power. Capacitor 6 is connected to DC bus 5 to stabilize DC voltage VDC of DC bus 5. Inverter 7 converts the DC power received from DC bus 5 into AC power having the commercial frequency, for example, and outputs the AC power to an output terminal.

Reactor 8 is connected between the output terminal of inverter 7 and one terminal of switch 10. Capacitor 9 is connected to the one terminal of switch 10. The other terminal of switch 10 is connected to output terminal T5.

Reactor 8 and capacitor 9 constitute a low pass filter, which enables the passage of the AC power having the commercial frequency, for example, generated by inverter 7, and disables the passage of a signal having the switching frequency generated by inverter 7. In other words, reactor 8 and capacitor 9 convert a rectangular wave-shaped AC voltage output from inverter 7 into a sinusoidal wave-shaped AC voltage.

Switch 10 is turned on in an inverter power feeding mode in which the AC power from inverter 7 is supplied to load 52, and is turned off in a bypass power feeding mode in which the AC power supplied from AC power supply 51 via bypass terminal T2 is supplied to load 52. Current detector 11 detects an instantaneous value of an AC current flowing between the other terminal of switch 10 and output terminal T5, and outputs a signal indicating the detected value to controller 17.

Bidirectional chopper 12 and switch 14 are connected in series between DC bus 5 and DC terminal T3. Switch 14 is turned on when the uninterruptible power supply device is used, and is turned off during maintenance of storage battery 53, for example. Bidirectional chopper 12 is controlled by controller 16, and transmits and receives DC power between DC bus 5 and storage battery 53.

Controller 16 controls bidirectional chopper 12 based on an AC voltage VAC supplied from AC power supply 51.

Controller 16 detects a voltage at a node between fuse 2 and reactor 3, for example, as AC voltage VAC.

When AC voltage VAC is normal (that is, when the AC power is supplied normally from AC power supply 51), controller 16 controls bidirectional chopper 12 such that a DC current flows from DC bus 5 to storage battery 53, to charge storage battery 53.

When AC voltage VAC is not normal (that is, when the AC power is not supplied normally from AC power supply 51), controller 16 controls bidirectional chopper 12 such that a DC current flows from storage battery 53 to DC bus 5, to discharge storage battery 53.

Bidirectional chopper 13 and switch 15 are connected in series between DC bus 5 and DC terminal T4. Switch 15 is turned on when the uninterruptible power supply device is used, and is turned off during maintenance of lithium ion battery 54, for example. Bidirectional chopper 13 is controlled by controller 17, and transmits and receives DC power between DC bus 5 and lithium ion battery 54.

Controller 17 controls bidirectional chopper 13 based on the output signal of current detector 11 and DC voltage VDC of DC bus 5. Controller 17 determines whether load 52 is performing the regenerative operation or the power running operation based on the output signal of current detector 11. Controller 17 performs three-phase to two-phase conversion (for example, dq conversion) on a three-phase AC current obtained from output signals of three current detectors 11, and obtains an active current and a reactive current. When the active current has a positive value (that is, when the active current is flowing from inverter 7 to load 52), controller 17 determines that load 52 is performing the power running operation, and when the active current has a negative value (that is, when the active current is flowing from load 52 to inverter 7), controller 17 determines that load 52 is performing the regenerative operation.

When load 52 is performing the regenerative operation and DC voltage VDC of DC bus 5 exceeds a threshold voltage Vth, controller 17 controls bidirectional chopper 13 such that a current flows from DC bus 5 to lithium ion battery 54, to charge lithium ion battery 54. Threshold voltage Vth is set to a voltage higher than rated voltage VR of DC voltage VDC by a predetermined voltage.

In a case where charge of lithium ion battery 54 is started, controller 17 continues the charge of lithium ion battery 54 even when DC voltage VDC of DC bus 5 becomes lower than threshold voltage Vth.

When load 52 is performing the power running operation, controller 17 controls bidirectional chopper 13 such that a DC current flows from lithium ion battery 54 to DC bus 5, to discharge lithium ion battery 54.

Thereby, DC voltage VDC of DC bus 5 can be reduced without supplying the regenerative power from load 52 to AC power supply 51. Therefore, an increase in DC voltage VDC of DC bus 5 can be suppressed even in a case where AC power supply 51 is a private power generator. In addition, since the regenerative power from load 52 can be utilized effectively, the uninterruptible power supply device can have an improved efficiency. Furthermore, by discharging lithium ion battery 54, lithium ion battery 54 can be charged when load 52 subsequently performs the regenerative operation.

Semiconductor switch 18 is connected between bypass terminal T2 and the other terminal of the switch 10, is turned on instantaneously when inverter 7 has a failure, and is turned off after a predetermined time. Switch 19 is connected in parallel with semiconductor switch 18, and is turned on when inverter 7 has a failure. When inverter 7 has a failure, semiconductor switch 18 is turned on instantaneously, switch 19 is turned on and switch 10 is turned off, and thereafter semiconductor switch 18 is turned off. Thereby, the AC power is supplied from AC power supply 51 to load 52 via switch 19, and operation of load 52 is continued.

It should be noted that the reason why semiconductor switch 18 is turned on only for the predetermined time is to prevent semiconductor switch 18 to be damaged by heat. Switch 19 is turned on not only when inverter 7 has a failure but also in the bypass power feeding mode in which the AC power of AC power supply 51 is directly supplied to load 52.

Next, operation of the uninterruptible power supply device will be described. It is assumed that the inverter power feeding mode is selected, switches 1, 10, 14, and 15 are turned on, and semiconductor switch 18 and switch 19 are turned off. When AC power is supplied normally from AC power supply 51, the AC power from AC power supply 51 is supplied to converter 4 via switch 1, fuse 2, and reactor 3, and is converted into DC power. The DC power generated by converter 4 is supplied to inverter 7 via DC bus 5, and is converted into AC power. The AC power generated by inverter 7 is supplied to load 52 via reactor 8 and switch 10.

In this case, since AC voltage VAC is supplied normally from AC power supply 51, controller 16 controls bidirectional chopper 12 such that a current flows from DC bus 5 to storage battery 53, to charge storage battery 53. A voltage between terminals of storage battery 53 is set to a predetermined target voltage.

When load 52 performs the regenerative operation, the regenerative power generated by load 52 flows backward through switch 10, reactor 8, and inverter 7, is converted into DC power, and is supplied to DC bus 5. When it is detected that a negative active current is flowing (that is, load 52 is performing the regenerative operation) based on the output signal of current detector 11, and it is detected that DC voltage VDC of DC bus 5 exceeds threshold voltage Vth, controller 17 controls bidirectional chopper 13 such that a current flows from DC bus 5 to lithium ion battery 54, to charge lithium ion battery 54.

In the case where charge of lithium ion battery 54 is started, controller 17 continues the charge of lithium ion battery 54 when load 52 is performing the regenerative operation, even when DC voltage VDC of DC bus 5 is lower than threshold voltage Vth.

When it is detected that a positive active current is flowing (that is, load 52 is performing the power running operation) based on the output signal of current detector 11, controller 17 controls bidirectional chopper 13 such that a DC current flows from lithium ion battery 54 to DC bus 5, to discharge lithium ion battery 54. DC power supplied from lithium ion battery 54 to DC bus 5 is converted into AC power by inverter 7, and is supplied to load 52.

When inverter 7 has a failure, semiconductor switch 18 is turned on instantaneously, and the AC power from AC power supply 51 is supplied to load 52 via semiconductor switch 18. Switch 10 is turned off and switch 19 is turned on, and thereafter semiconductor switch 18 is turned off. Thereby, the AC power from AC power supply 51 is supplied to load 52 via switch 19, and operation of load 52 is continued.

When the AC power is not supplied normally from AC power supply 51, operation of converter 4 is stopped. In this case, since AC voltage VAC from AC power supply 51 becomes abnormal, controller 16 controls bidirectional chopper 12 such that a current flows from storage battery 53 to DC bus 5, to discharge storage battery 53. DC power supplied from storage battery 53 to DC bus 5 is converted into AC power by inverter 7, and is supplied to load 52. Therefore, operation of load 52 can be continued as long as the DC power is stored in storage battery 53.

Controller 17 operates as in the case where AC voltage VAC from AC power supply 51 is normal, and causes lithium ion battery 54 to be charged when load 52 is performing the regenerative operation, and causes lithium ion battery 54 to be discharged when load 52 is performing the power running operation.

When the voltage between the terminals of storage battery 53 is reduced to a discharge end voltage, discharge of storage battery 53 is stopped. When a voltage between terminals of lithium ion battery 54 is reduced to a discharge end voltage, discharge of lithium ion battery 54 is stopped. Thus, operation of inverter 7 is stopped, and operation of load 52 is stopped.

As described above, in the first embodiment, DC bus 5 is connected to lithium ion battery 54 via bidirectional chopper 13, lithium ion battery 54 is charged when load 52 is performing the regenerative operation, and lithium ion battery 54 is discharged when the load is performing the power running operation. Therefore, an increase in DC voltage VDC of DC bus 5 can be suppressed without returning the regenerative power generated by load 52 to AC power supply 51. In addition, since the regenerative power generated by load 52 can be utilized effectively, the uninterruptible power supply device can have an improved efficiency.

It should be noted that, instead of lithium ion battery 54, an electric double layer capacitor may be provided, or an electrolytic capacitor may be provided.

Second Embodiment

Generally, a load configured not to perform a regenerative operation is often connected to an uninterruptible power supply device, and a load configured to perform a regenerative operation is not often connected thereto. If a load configured not to perform a regenerative operation is connected to an uninterruptible power supply device, bidirectional chopper 13 and lithium ion battery 54 are not used in the uninterruptible power supply device in the first embodiment, and thus they become useless. A solution to this problem is sought in a second embodiment.

Figure 2:
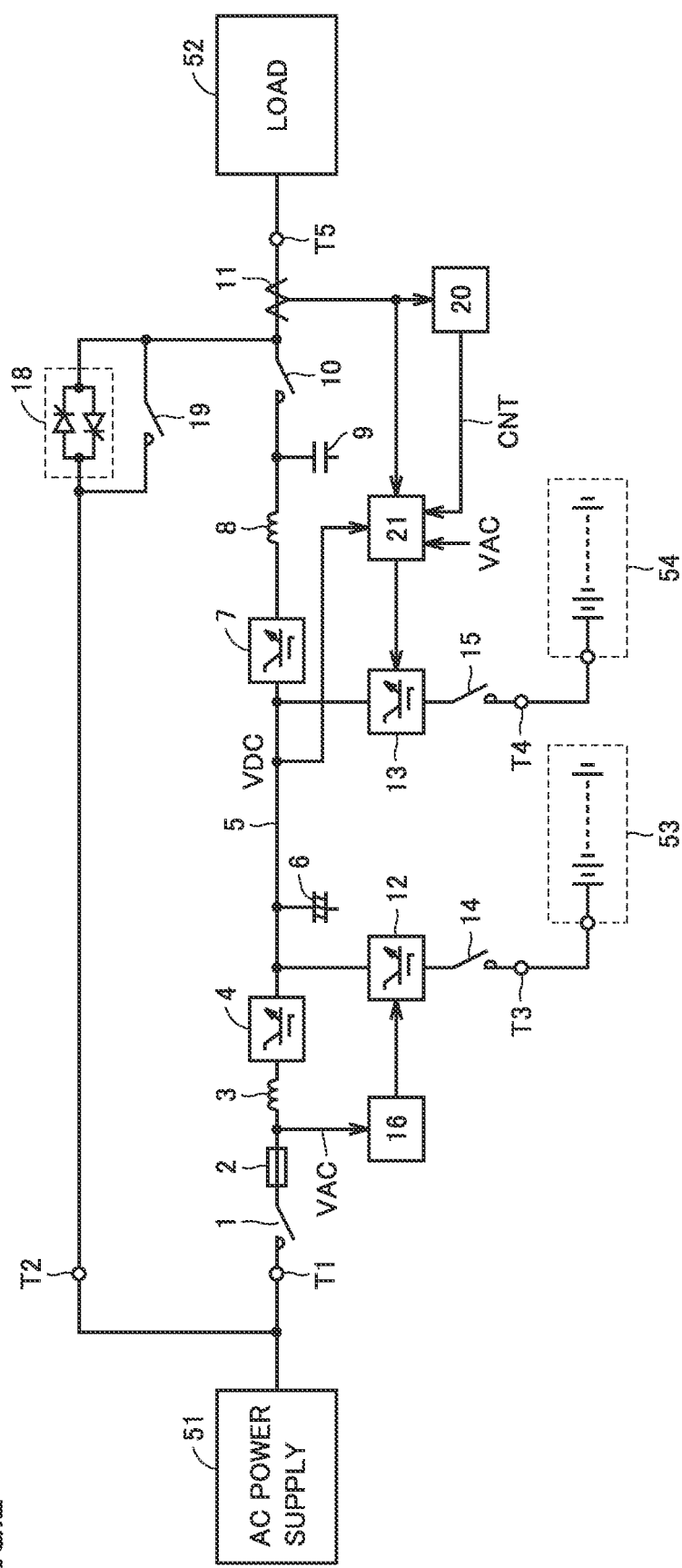
FIG. 2 is a circuit block diagram showing a configuration of an uninterruptible power supply device in accordance with a second embodiment of the present invention.

FIG. 2 is a circuit block diagram showing a configuration of an uninterruptible power supply device in accordance with a second embodiment of the present invention, which is compared with FIG. 1. Referring to FIG. 2, this uninterruptible power supply device is different from the uninterruptible power supply device in FIG. 1 in that a monitoring unit 20 and a controller 21 are provided instead of controller 17.

Monitoring unit 20 determines whether load 52 is performing a regenerative operation or a power running operation based on the output signal of current detector 11, and sets a control signal CNT to an "L" level when the regenerative operation of load 52 is performed within a predetermined time. Monitoring unit 20 sets control signal CNT to an "H" level when the regenerative operation of load 52 is not performed even after the lapse of the predetermined time. This is because, if the regenerative operation of load 52 is not performed even after the lapse of the predetermined time, it is estimated that load 52 configured to perform a power running operation only is connected.

When control signal CNT is at an "L" level, controller 21 operates as with controller 17 in the first embodiment (that is, performs a first mode). Controller 21 controls bidirectional chopper 13 based on the output signal of current detector 11 and DC voltage VDC of DC bus 5. Controller 21 determines whether load 52 is performing the regenerative operation or the power running operation based on the output signal of current detector 11.

When load 52 is performing the regenerative operation and DC voltage VDC of DC bus 5 exceeds threshold voltage Vth, controller 21 controls bidirectional chopper 13 such that a current flows from DC bus 5 to lithium ion battery 54, to charge lithium ion battery 54. In a case where charge of lithium ion battery 54 is started, controller 21 continues the charge of lithium ion battery 54 even when DC voltage VDC of DC bus 5 becomes lower than threshold voltage Vth.

When load 52 is performing the power running operation, controller 21 controls bidirectional chopper 13 such that a DC current flows from lithium ion battery 54 to DC bus 5, to discharge lithium ion battery 54.

When control signal CNT is at an "H" level, controller 21 operates as with controller 16 (that is, performs a second mode). Controller 21 controls bidirectional chopper 13 based on AC voltage VAC supplied from AC power supply 51. When AC voltage VAC is normal (that is, when the AC power is supplied normally from AC power supply 51), controller 21 controls bidirectional chopper 13 such that a DC current flows from DC bus 5 to lithium ion battery 54, to charge lithium ion battery 54.

When AC voltage VAC is not normal (that is, when the AC power is not supplied normally from AC power supply 51), controller 21 controls bidirectional chopper 13 such that a DC current flows from lithium ion battery 54 to DC bus 5, to discharge lithium ion battery 54. Since other configurations and operations are the same as those in the first embodiment, the description thereof will not be repeated.

In the second embodiment, the same effect as that in the first embodiment can be obtained. In addition, even when load 52 configured to perform a power running operation only is connected, bidirectional chopper 13 and lithium ion battery 54 can be used effectively, and the amount of power which can be supplied in case of power failure can be increased.

Third Embodiment

In the second embodiment, whether load 52 is performing the regenerative operation or the power running operation is determined based on a detection result of current detector 11, and when a time for which load 52 is not performing the regenerative operation exceeds the predetermined time, lithium ion battery 54 is used as a battery for supplying power during power failure. However, in a case where whether or not load 52 is configured to perform the regenerative operation is clear without operating load 52, monitoring unit 20 becomes useless, leading to cost increase. A solution to this problem is sought in a third embodiment.

Figure 3:
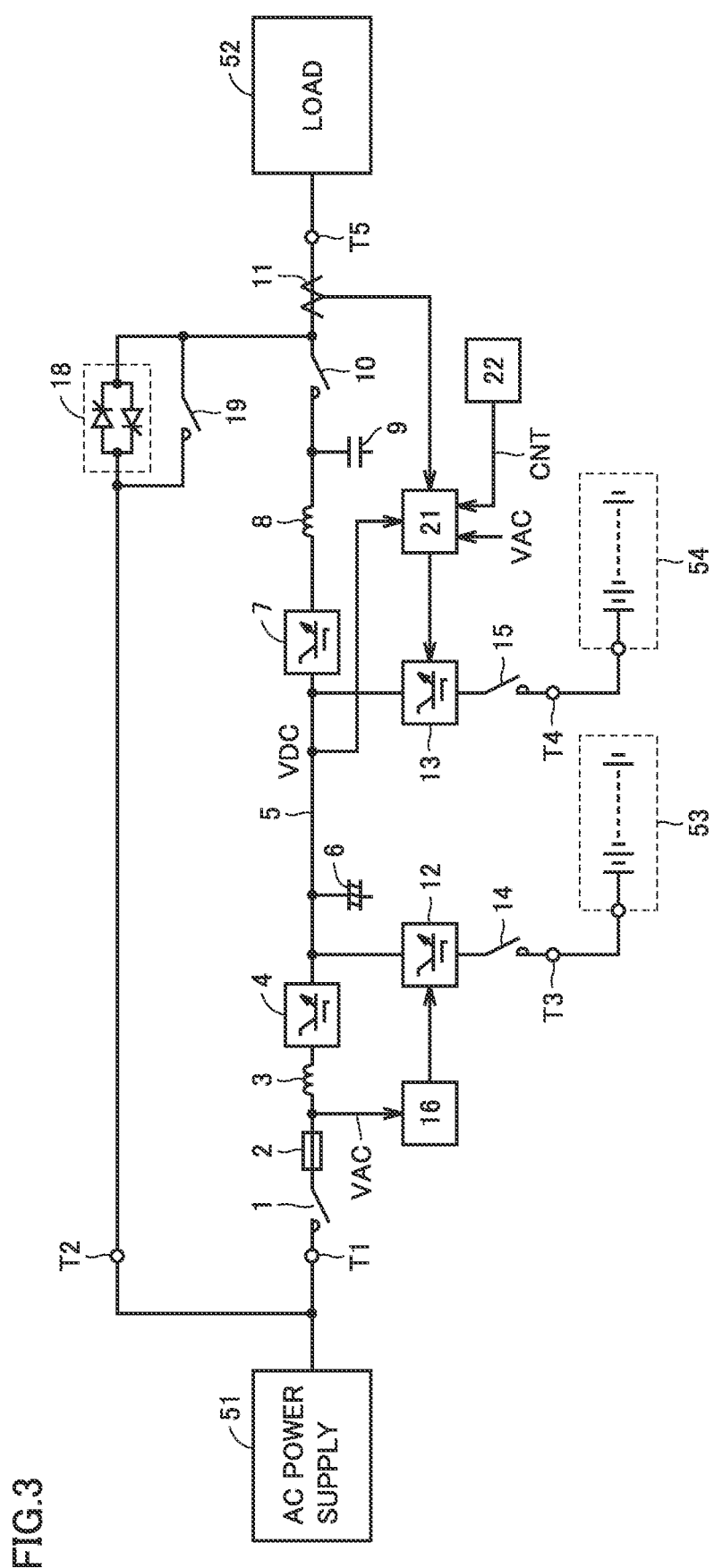
FIG. 3 is a circuit block diagram showing a configuration of an uninterruptible power supply device in accordance with a third embodiment of the present invention.

FIG. 3 is a circuit block diagram showing a configuration of an uninterruptible power supply device in accordance with a third embodiment of the present invention, which is compared with FIG. 2. Referring to FIG. 3, this uninterruptible power supply device is different from the uninterruptible power supply device in FIG. 2 in that monitoring unit 20 is replaced with a setting unit 22.

Setting unit 22 includes a button or the like to be operated by a user of the uninterruptible power supply device, and is used to set whether or not load 52 is the one configured to perform the regenerative operation. When it is set by the user that load 52 is the one configured to perform the regenerative operation, setting unit 22 sets control signal CNT to an "L"

level. When it is set by the user that load 52 is the one configured not to perform the regenerative operation, setting unit 22 sets control signal CNT to an "H" level. Setting unit 22 constitutes a selector configured to select any one mode of the first mode and the second mode.

Controller 21 is the same as the one shown in FIG. 3, and controls bidirectional chopper 13 based on control signal CNT and AC voltage VAC. Since other configurations and operations are the same as those in the second embodiment, the description thereof will not be repeated.

In the third embodiment, cost reduction can be achieved when compared with the second embodiment.

Fourth Embodiment

Figure 4:
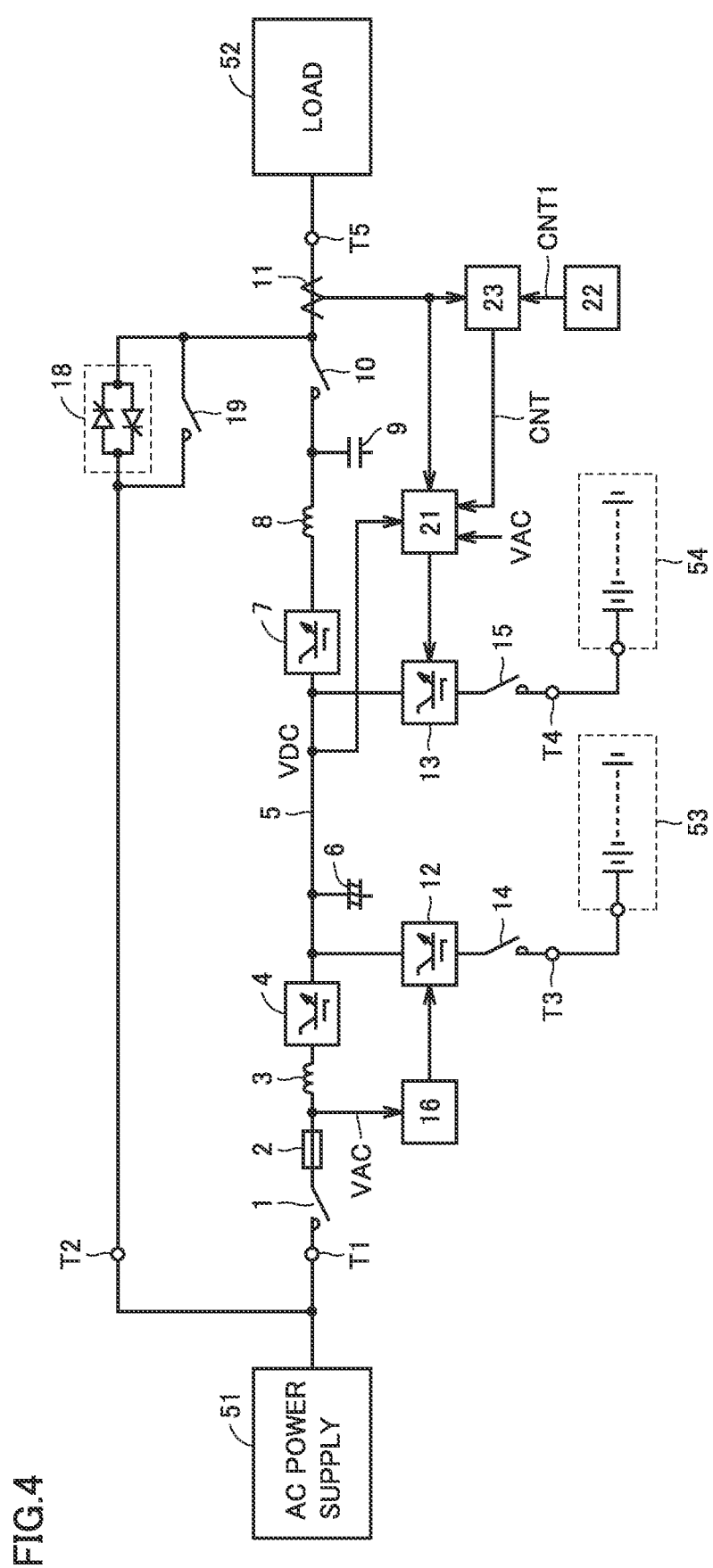
FIG. 4 is a circuit block diagram showing a configuration of an uninterruptible power supply device in accordance with a fourth embodiment of the present invention.

FIG. 4 is a circuit block diagram showing a configuration of an uninterruptible power supply device in accordance with a fourth embodiment of the present invention, which is compared with FIG. 3. Referring to FIG. 4, this uninterruptible power supply device is different from the uninterruptible power supply device in FIG. 3 in that a monitoring unit 23 is added.

When it is set by the user that load 52 is the one configured to perform the regenerative operation, setting unit 22 sets a control signal CNT1 to an "L" level. When control signal CNT1 from setting unit 22 is at an "L" level, monitoring unit 23 operates as with monitoring unit 20 in FIG. 2. Monitoring unit 23 sets control signal CNT to an "L" level when the regenerative operation of load 52 is performed within a predetermined time, and sets control signal CNT to an "H" level when the regenerative operation of load 52 is not performed even after the lapse of the predetermined time.

When control signal CNT1 from setting unit 22 is at an "H" level, monitoring unit 23 sets control signal CNT to an "H" level. Even in a case where control signal CNT1 from setting unit 22 is at an "H" level, monitoring unit 23 operates as with monitoring unit 20 in FIG. 2 when the regenerative operation of load 52 is performed, and sets control signal CNT to an "L" level when the regenerative operation of load 52 is performed within a predetermined time. Monitoring unit 23 sets control signal CNT to an "H" level when the regenerative operation of load 52 is not performed even after the lapse of the predetermined time. Since other configurations and operations are the same as those in the second and third embodiments, the description thereof will not be repeated.

In the fourth embodiment, even in a case where the user connects one of a load configured to perform a regenerative operation and a load configured not to perform a regenerative operation, and thereafter changes the one load to the other load, operation of controller 21 can be switched without operating setting unit 22. Therefore, even in a case where the user forgets to operate setting unit 22 when the user changes the one load to the other load, operation of controller 21 can be automatically switched.

Fifth Embodiment

Figure 5:
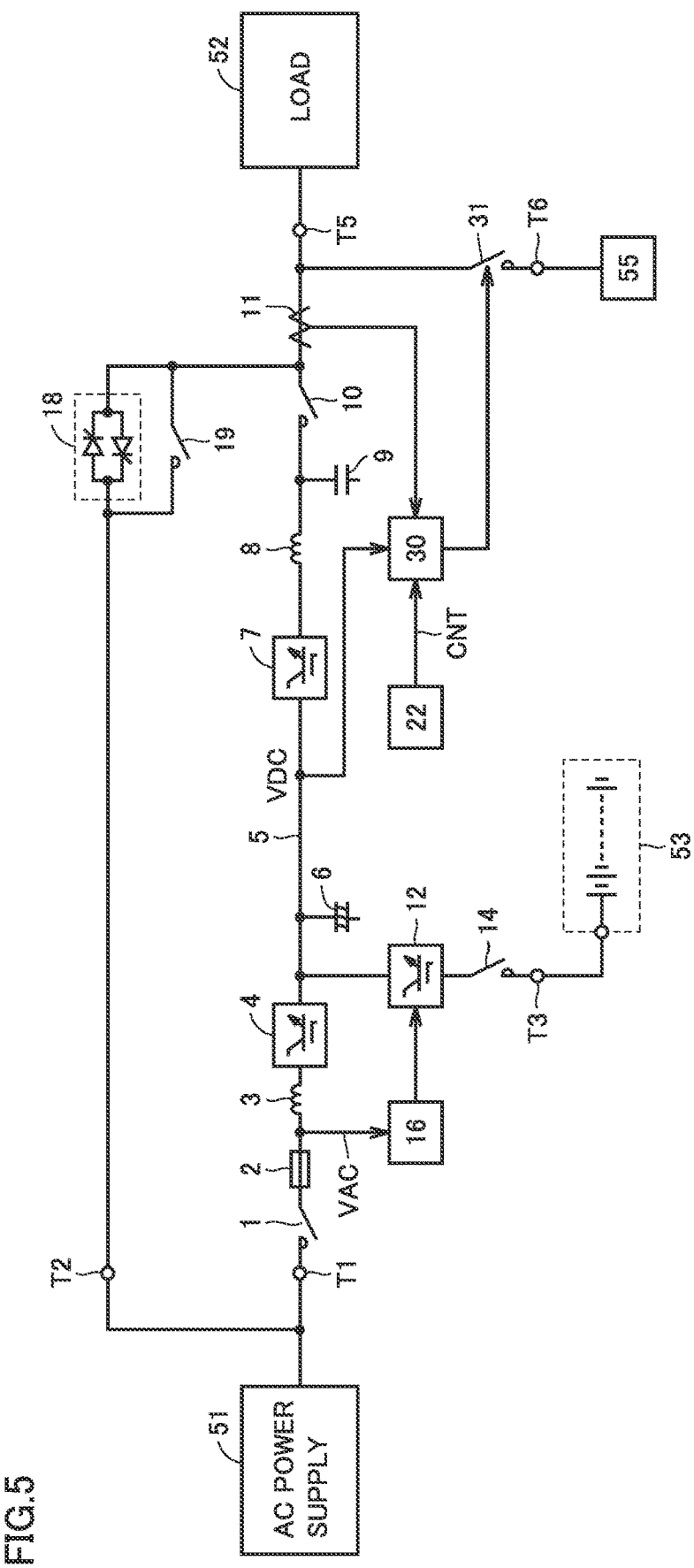
FIG. 5 is a circuit block diagram showing a configuration of an uninterruptible power supply device in accordance with a fifth embodiment of the present invention.

FIG. 5 is a circuit block diagram showing a configuration of an uninterruptible power supply device in accordance with a fifth embodiment of the present invention, which is compared with FIG. 3. Referring to FIG. 5, this uninterruptible power supply device is different from the uninterruptible power supply device in FIG. 3 in that a controller 30, a switch 31, and a load terminal T6 are provided instead of bidirectional chopper 13, switch 15, DC terminal T4, and controller 21.

Switch 31 is connected between output terminal T5 and load terminal T6, and is controlled by controller 30. A load 55 for consuming the regenerative power generated by load 52 is connected to load terminal T6. Load 55 is, for example, a resistive element, an inductor, or the like.

Setting unit 22 is the same as the one shown in FIG. 3. When it is set by the user that load 52 is the one configured to perform the regenerative operation, setting unit 22 sets control signal CNT to an "L" level. When it is set by the user that load 52 is the one configured not to perform the regenerative operation, setting unit 22 sets control signal CNT to an "H" level.

When control signal CNT is at an "L" level, controller 30 controls switch 31 based on the output signal of current detector 11 and DC voltage VDC of DC bus 5. Controller 30 determines whether load 52 is performing the regenerative operation or the power running operation based on the output signal of current detector 11.

When load 52 is performing the regenerative operation and DC voltage VDC of DC bus 5 exceeds threshold voltage Vth, controller 30 turns on switch 31. Thereby, at least a portion of the regenerative power generated by load 52 is supplied to load 55 via switch 31, and is consumed by load 55. When controller 30 turns on switch 31, controller 30 keeps switch 31 ON even when DC voltage VDC of DC bus 5 becomes lower than threshold voltage Vth.

When load 52 is performing the power running operation, controller 30 turns off switch 31. When control signal CNT is at an "H" level, controller 30 sets switch 31 to an OFF state. Even in a case where control signal CNT is at an "H" level, controller 30 turns on switch 31 when load 52 is performing the regenerative operation. Since other configurations and operations are the same as those in the first embodiment, the description thereof will not be repeated.

In the fifth embodiment, switch 31 is connected between output terminal T5 to which load 52 is connected and load terminal T6 to which load 55 for consuming the regenerative power generated by load 52 is connected, switch 31 is turned on when load 52 is performing the regenerative operation, and switch 31 is turned off when load 52 is performing the power running operation. Therefore, an increase in DC voltage VDC of DC bus 5 can be suppressed without returning the regenerative power generated by load 52 to AC power supply 51.

Sixth Embodiment

Figure 6:
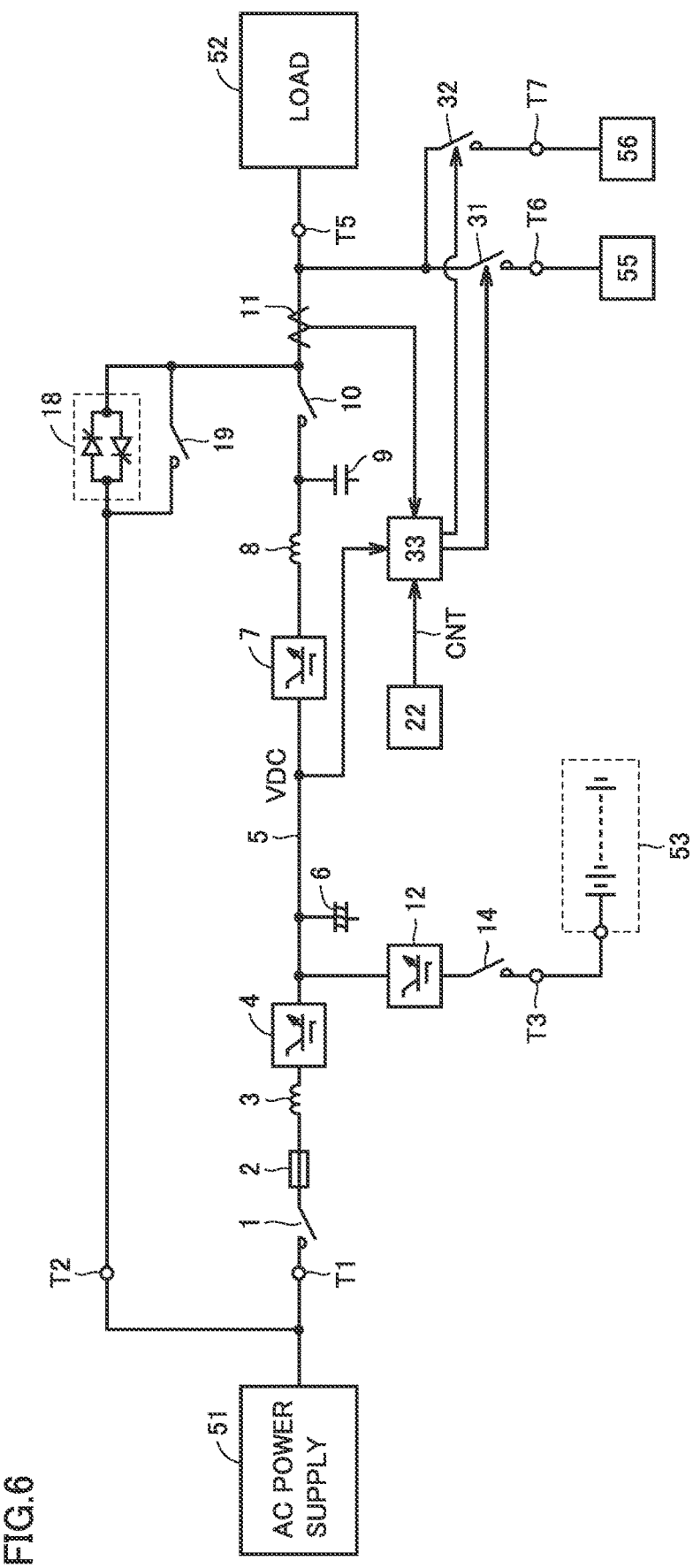
FIG. 6 is a circuit block diagram showing a configuration of an uninterruptible power supply device in accordance with a sixth embodiment of the present invention.

FIG. 6 is a circuit block diagram showing a configuration of an uninterruptible power supply device in accordance with a sixth embodiment of the present invention, which is compared with FIG. 5. Referring to FIG. 6, this uninterruptible power supply device is different from the uninterruptible power supply device in FIG. 5 in that controller 30 is replaced with a controller 33, and a switch 32 and a load terminal T7 are added.

Switch 32 is connected between output terminal T5 and load terminal T7, and is controlled by controller 33. A load 56 for consuming the regenerative power generated by load 52 is connected to load terminal T7. Load 56 is, for example, a resistive element, an inductor, or the like.

When control signal CNT is at an "L" level, controller 33 controls switches 31 and 32 based on the output signal of current detector 11 and DC voltage VDC of DC bus 5. Controller 33 obtains an active current flowing to load 52 based on output signals of three current detectors 11. When the active current has a negative value (that is, when the active current is flowing from load 52), controller 33 determines that load 52 is performing the regenerative operation, and when the active current has a positive value (that is, when the active current is flowing into load 52), controller 33 determines that load 52 is performing the power running operation.

When load 52 is performing the regenerative operation and DC voltage VDC of DC bus 5 exceeds threshold voltage Vth, controller 33 turns on only switch 31 of switches 31 and 32 if an absolute value of the active current is smaller than a threshold current, and turns on both switches 31 and 32 if the absolute value of the active current is larger than the threshold current. Thereby, when a regenerative current generated by load 52 is relatively small, the regenerative current can be consumed by load 55 only, and when the regenerative current generated by load 52 is relatively large, the regenerative current can be consumed by loads 55 and 56. Since other configurations and operations are the same as those in the fifth embodiment, the description thereof will not be repeated.

In the sixth embodiment, the same effect as that in the fifth embodiment can be obtained. In addition, since the number of loads for consuming the regenerative power is changed depending on the magnitude of the regenerative current generated by load 52, fluctuations in voltage at output terminal T5 caused by turning on/off switches 31 and 32 can be suppressed to be small.

It should be noted that, although a set of switch 31 and load 55 and a set of switch 32 and load 56 are provided in the sixth embodiment, the present invention is not limited thereto, and three or more sets of one switch and one load may be provided to change the number of switches to be turned on depending on the magnitude of the regenerative current generated by load 52.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

T1: input terminal; T2: bypass terminal; T3, T4: DC terminal; T5: output terminal; T6, T7: load terminal; 1, 10, 14, 15, 19, 31, 32: switch; 2: fuse; 3, 8: reactor; 4: converter; 5: DC bus; 6, 9: capacitor; 7: inverter; 11: current detector; 12, 13: bidirectional chopper; 16, 17, 21, 30, 33: controller; 18: semiconductor switch; 20, 23: monitoring unit; 22: setting unit; 51: AC power supply; 52, 55, 56: load; 53: storage battery; 54: lithium ion battery.

The invention claimed is:

1. An uninterruptible power supply device comprising:
a converter configured to convert AC power from an AC power supply into DC power and output the DC power to a DC bus;
an inverter configured to convert the DC power received from the DC bus into AC power and supply the AC power to a load;
a first bidirectional chopper configured to transmit and receive DC power between the DC bus and a first power storage device;
a second bidirectional chopper configured to transmit and receive DC power between the DC bus and a second power storage device;
a first controller configured to control the first bidirectional chopper such that a current flows from the DC bus to the first power storage device when the AC power is supplied normally from the AC power supply, and control the first bidirectional chopper such that a current flows from the first power storage device to the DC bus when the AC power is not supplied normally from the AC power supply; and
a second controller configured to perform a first mode,
wherein in the first mode, the second controller is configured to control the second bidirectional chopper such that a current flows from the DC bus to the second power storage device when the load is performing a regenerative operation, and control the second bidirectional chopper such that a current flows from the second power storage device to the DC bus when the load is performing a power running operation,
wherein the second controller is configured to perform the first mode when a time for which the load is not performing the regenerative operation is shorter than a predetermined time, and perform a second mode when the time for which the load is not performing the regenerative operation is longer than the predetermined time, and
wherein in the second mode, the second controller is configured to control the second bidirectional chopper such that the current flows from the DC bus to the second power storage device when the AC power is supplied normally from the AC power supply, and control the second bidirectional chopper such that the current flows from the second power storage device to the DC bus when the AC power is not supplied normally from the AC power supply.

2. The uninterruptible power supply device according to claim 1, further comprising a current detector configured to detect a current flowing between the inverter and the load, wherein
the second controller is configured to determine whether the load is performing the regenerative operation or the power running operation based on a detection result of the current detector, and control the second bidirectional chopper based on a determination result.

3. The uninterruptible power supply device according to claim 2, wherein
the inverter is configured to convert the DC power received from the DC bus into three-phase AC power and supply the three-phase AC power to the load,
the current detector is configured to detect a three-phase AC current flowing between the inverter and the load, and
the second controller is configured to perform three-phase to two-phase conversion on the three-phase AC current detected by the current detector and obtain an active current and a reactive current, determine that the load is performing the power running operation when the active current is flowing from the inverter to the load, and determine that the load is performing the regenerative operation when the active current is flowing from the load to the inverter.

4. The uninterruptible power supply device according to claim 1, wherein
the second controller is configured to start controlling the second bidirectional chopper such that the current flows from the DC bus to the second power storage device when the load is performing the regenerative operation and a voltage of the DC bus exceeds a predetermined threshold voltage, and after the second controller starts controlling the second bidirectional chopper, the second controller is configured to continue controlling the second bidirectional chopper such that the current flows from the DC bus to the second power storage device when the load is performing the regenerative operation, even when the voltage of the DC bus is lower than the predetermined threshold voltage.

5. The uninterruptible power supply device according to claim 1, wherein the second power storage device is a lithium ion battery.

6. The uninterruptible power supply device according to claim wherein the second power storage device is an electric double layer capacitor.

7. The uninterruptible power supply device according to claim 1, wherein the second power storage device is an electrolytic capacitor.

8. An uninterruptible power supply device comprising:
a first terminal connected to a first load;
a second terminal connected to a second load for consuming regenerative power generated by the first load;
a converter configured to convert AC power from an AC power supply into DC power and output the DC power to a DC bus;
an inverter configured to convert the DC power received from the DC bus into AC power and output the AC power to the first terminal;
a bidirectional chopper configured to transmit and receive DC power between the DC bus and a power storage device;
a first controller configured to control the bidirectional chopper such that a current flows from the DC bus to the power storage device when the AC power is supplied normally from the AC power supply, and control the bidirectional chopper such that a current flows from the power storage device to the DC bus when the AC power is not supplied normally from the AC power supply;
a first switch connected between the first and second terminals;
a second controller configured to perform a first mode;
a current detector configured to detect a current flowing between the inverter and the first terminal;
a third terminal to which a third load for consuming the regenerative power generated by the first load is connected; and
a second switch connected between the first and third terminals,
wherein in the first mode, the second controller being configured to turn on the first switch when the first load is performing a regenerative operation, and turn off the first switch when the first load is performing a power running operation,
wherein the second controller is configured to determine whether the first load is performing the regenerative operation or the power running operation based on a detection result of the current detector, and turn on or off the first switch based on a determination result,
wherein the inverter is configured to convert the DC power received from the DC bus into three-phase AC power and output the three-phase AC power to the first terminal,
wherein the current detector is configured to detect a three-phase AC current flowing between the inverter and the first terminal,
wherein the second controller is configured to perform three-phase to two-phase conversion on the three-phase AC current detected by the current detector and obtain an active current and a reactive current, determine that the first load is performing the power running operation when the active current is flowing from the inverter to the first terminal, and determine that the first load is performing the regenerative operation when the active current is flowing from the first terminal to the inverter, and
wherein when the first load is performing the regenerative operation, the second controller is configured to turn on only the first switch of the first and second switches if the active current is smaller than a predetermined threshold current, and turn on both the first and second switches if the active current is larger than the predetermined threshold current.

9. The uninterruptible power supply device according to claim 8, wherein
the second controller is configured to turn on the first switch when the load is perfoiiiiing the regenerative operation and a voltage of the DC bus exceeds a predetermined threshold voltage, and
after the second controller turns on the first switch, the second controller is configured to keep the first switch ON when the first load is performing the regenerative operation, even when the voltage of the DC bus is lower than the predetermined threshold voltage.

10. The uninterruptible power supply device according to claim 8, further comprising a selector configured to select any one mode of the first mode and a second mode in which the first switch is set to an OFF state, wherein
in a case where the first mode is selected, the second controller is configured to perform the first mode, and
in a case where the second mode is selected, the second controller is configured to perform the second mode.

11. The uninterruptible power supply device according to claim 10, wherein, even in the case where the second mode is selected by the selector, the second controller is configured to perform the first mode when the first load is performing the regenerative operation.

* * * * *